United States Patent
Bettaiah et al.

(10) Patent No.: US 10,549,431 B2
(45) Date of Patent: Feb. 4, 2020

(54) GRIPPER WITH A TRIDENT BODY SECTION

(71) Applicant: Dover India Pvt. Ltd., Bangalore (IN)

(72) Inventors: ShashiKumar Bettaiah, Bangalore (IN); Ravi Kumar Shivanna, Bangalore (IN)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 16/159,630

(22) Filed: Oct. 13, 2018

(65) Prior Publication Data
US 2019/0381676 A1 Dec. 19, 2019

(30) Foreign Application Priority Data
Jun. 15, 2018 (IN) .............................. 201831022516

(51) Int. Cl.
*B25J 15/04* (2006.01)
*B25J 15/02* (2006.01)
(Continued)

(52) U.S. Cl.
CPC ........... *B25J 15/0226* (2013.01); *B25B 5/087* (2013.01); *B25B 5/163* (2013.01); *B25J 15/0425* (2013.01)

(58) Field of Classification Search
CPC .... B25J 15/0226; B25J 15/0425; B25B 5/087
See application file for complete search history.

(56) References Cited

U.S. PATENT DOCUMENTS

| | | | |
|---|---|---|---|
| 4,518,187 A | 5/1985 | Blatt et al. | |
| 4,607,873 A | 8/1986 | Nusbaumer et al. | |

(Continued)

FOREIGN PATENT DOCUMENTS

| | | |
|---|---|---|
| DE | 202004017445 U1 | 1/2005 |
| DE | 10324272 B3 | 3/2005 |

(Continued)

OTHER PUBLICATIONS

Extended European Search Report dated Oct. 19, 2019 in corresponding European Application No. EP19180245.3.

*Primary Examiner* — Paul T Chin
(74) *Attorney, Agent, or Firm* — Harness, Dickey & Pierce, P.L.C.

(57) ABSTRACT

A modular gripper has a body with a trident section and cylindrical section. A powering assembly is positioned in the cylindrical section. A pair of oppositing jaws is pivotally secured between a center wall and a pair of side wall, respectively, of the trident section. The piston rod moves a cam assembly on the center wall. The cam assembly passes through a body having a trident section and cylindrical section. The trident section comprises a trident structure that includes, at one end, a pair of side walls along with a center wall. The cylindrical section includes a fluid driven powering assembly. A pair of opposing jaw member are pivotally secured to the trident portion about separate pivot pins. A cam assembly is operatively connected to a piston rod of the fluid driven powering assembly. The cam assembly extends laterally outward with respect to a cylinder bore axis to receive a cam bush that engages with a through slot on each of the pair of opposing jaw members. The jaws rotate with respect to one another in response to fluid power in the cylindrical section. A pair of side plate members, each slide plate member has an elongated blind slot that receives an end of the cam assembly, the ends travel in the blind slot. Cam slots in the pair of opposing jaws, via a cam bushing.

17 Claims, 14 Drawing Sheets

(51) Int. Cl.
  *B25B 5/16* (2006.01)
  *B25B 5/08* (2006.01)

(56) References Cited

U.S. PATENT DOCUMENTS

| | | | |
|---|---|---|---|
| 4,845,698 A * | 7/1989 | Baas | G11B 7/08517 |
| | | | 369/30.15 |
| 4,852,928 A | 8/1989 | Monforte | |
| 5,284,375 A * | 2/1994 | Land, III | E21B 19/14 |
| | | | 294/115 |
| 5,301,533 A | 4/1994 | Jackson | |
| 5,503,378 A | 4/1996 | Schauss | |
| 5,853,211 A | 12/1998 | Sawdon et al. | |
| 5,871,250 A | 2/1999 | Sawdon | |
| 5,938,259 A | 8/1999 | Sawdon et al. | |
| 5,941,513 A | 8/1999 | Moilanen et al. | |
| 6,048,013 A | 4/2000 | Moilanen et al. | |
| 6,056,281 A * | 5/2000 | Moilanen | B25B 5/087 |
| | | | 269/32 |
| 6,079,896 A | 6/2000 | Dellach | |
| 6,176,533 B1 | 1/2001 | Moilanen et al. | |
| 6,227,586 B1 | 5/2001 | Moilanen et al. | |
| 6,253,460 B1 | 7/2001 | Schmitz | |
| 6,273,408 B1 | 8/2001 | Moilanen et al. | |
| 6,276,733 B1 | 8/2001 | Moilanen et al. | |
| 6,425,616 B2 | 7/2002 | Moilanen et al. | |
| 6,530,615 B2 | 3/2003 | Filipiak et al. | |
| 6,557,916 B2 | 5/2003 | Moilanen et al. | |
| 6,575,512 B2 | 6/2003 | Moilanen et al. | |
| 6,588,816 B1 | 7/2003 | Moilanen | |
| 6,641,189 B2 | 11/2003 | Moilanen et al. | |
| 6,948,708 B2 | 9/2005 | Moilanen et al. | |
| 7,032,944 B2 | 4/2006 | Moilanen et al. | |
| 7,172,230 B2 | 2/2007 | Maffeis | |
| 7,396,059 B2 | 7/2008 | Maffeis | |
| 7,845,698 B2 | 12/2010 | Jenkins et al. | |
| 7,976,087 B2 | 7/2011 | Maffeis | |
| 8,104,810 B2 * | 1/2012 | Holcomb | B25J 15/0226 |
| | | | 294/192 |
| 8,167,346 B2 | 5/2012 | Filipiak | |
| 8,454,069 B2 | 6/2013 | Jenkins et al. | |
| 8,919,844 B1 * | 12/2014 | Mascorro | B25J 13/086 |
| | | | 294/192 |
| 9,694,500 B1 * | 7/2017 | Ferrier | B25J 13/08 |
| 9,975,252 B2 | 5/2018 | Zimmerman et al. | |
| 2001/0006295 A1 | 7/2001 | Moilanen et al. | |
| 2002/0093211 A1 * | 7/2002 | Filipiak | B25B 5/087 |
| | | | 294/203 |
| 2003/0038492 A1 | 2/2003 | Kruger | |
| 2003/0151266 A1 | 8/2003 | Moilanen et al. | |
| 2004/0130083 A1 * | 7/2004 | Moilanen | B25B 5/087 |
| | | | 269/32 |
| 2005/0035516 A1 | 2/2005 | Sawdon et al. | |
| 2005/0104396 A1 | 5/2005 | Maffeis | |
| 2008/0018124 A1 * | 1/2008 | Waldorf | B25B 5/087 |
| | | | 294/116 |
| 2008/0073922 A1 | 3/2008 | Holtz | |
| 2008/0237957 A1 | 10/2008 | Waldorf | |
| 2009/0108513 A1 | 4/2009 | Hara et al. | |
| 2011/0018292 A1 | 1/2011 | Waldorf et al. | |
| 2016/0082601 A1 * | 3/2016 | Zimmerman | B25J 15/0028 |
| | | | 294/197 |

FOREIGN PATENT DOCUMENTS

| | | |
|---|---|---|
| DE | 10338061 A1 | 3/2005 |
| DE | 102004025781 A1 | 7/2005 |
| DE | 102004058994 A1 | 6/2006 |
| DE | 102012003918 A1 | 8/2013 |
| EP | 0 857 547 A1 | 8/1998 |
| JP | 2002151889 A | 5/2002 |
| WO | WO-2014023286 A1 | 2/2014 |

* cited by examiner

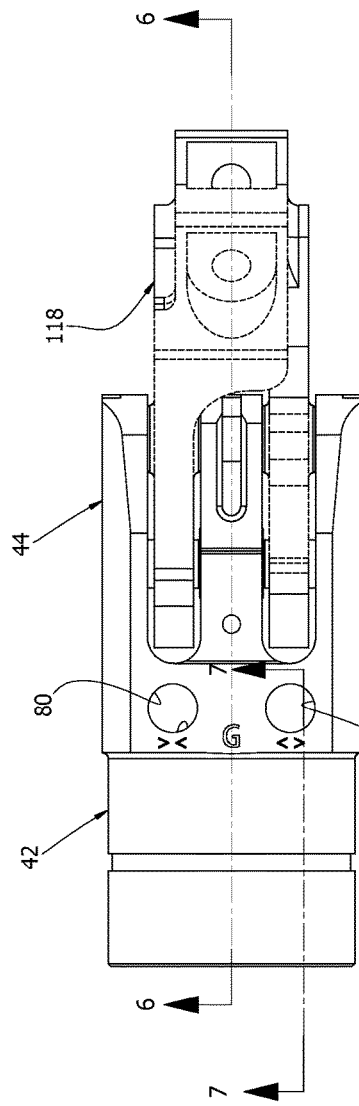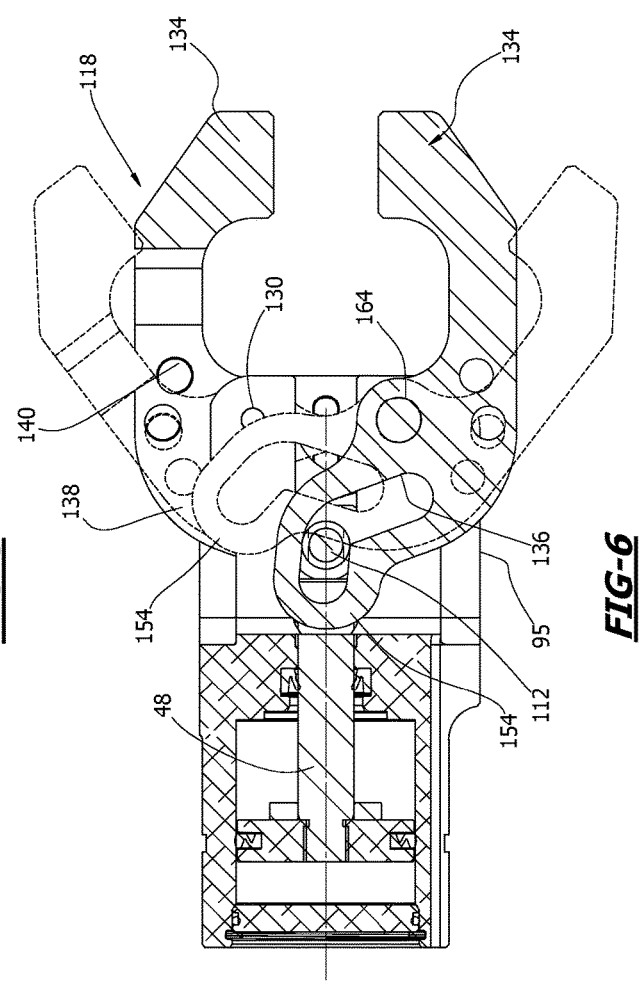

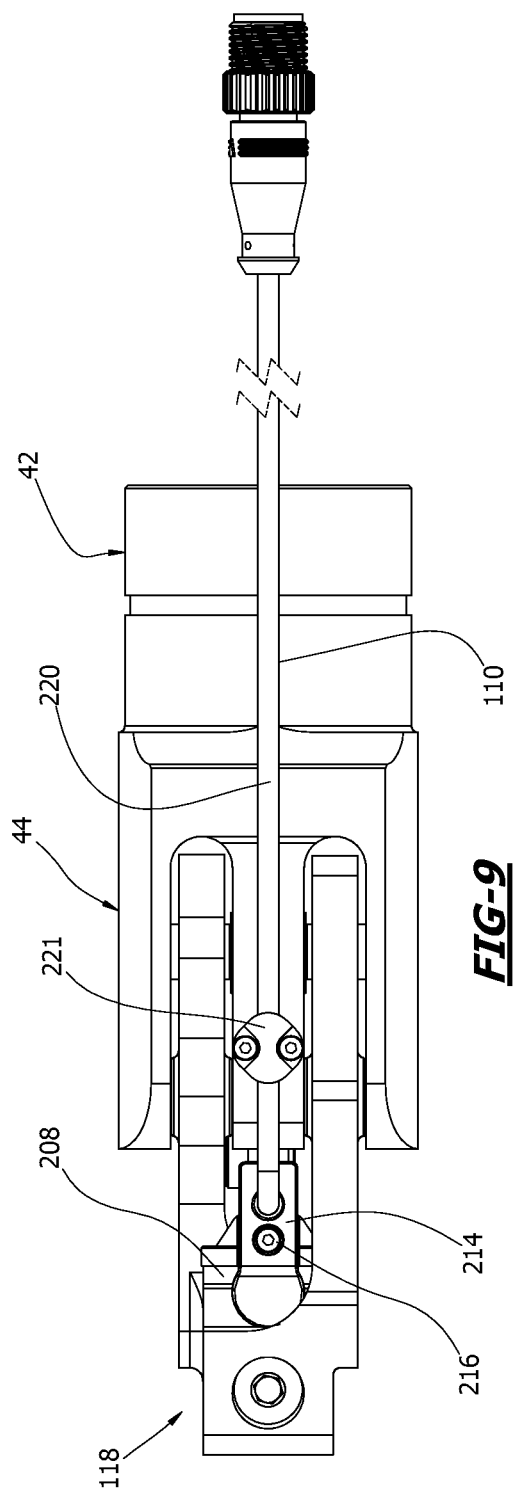

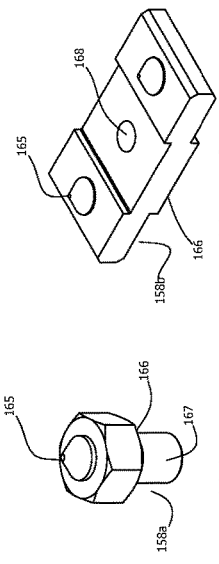
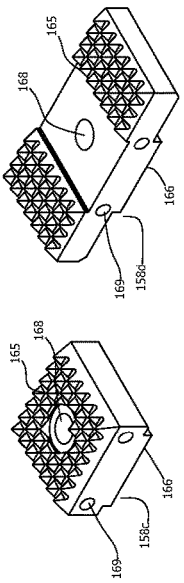
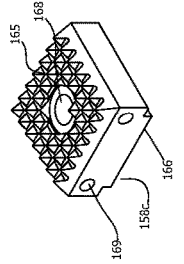
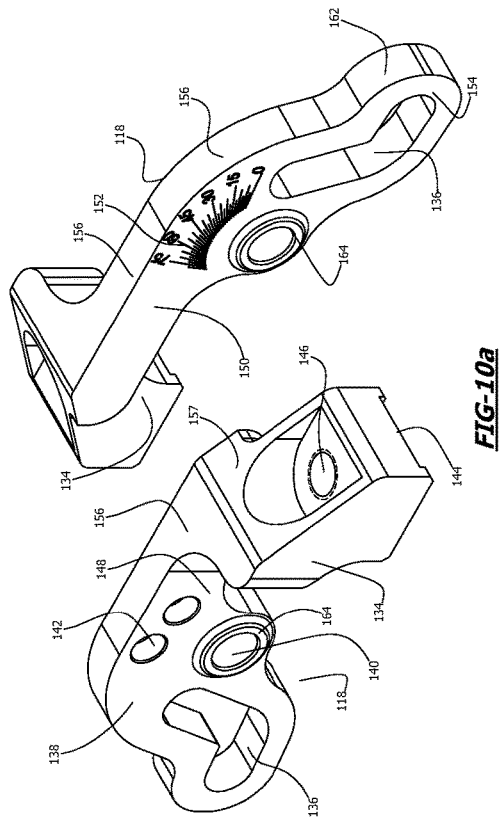

GRIPPER WITH A TRIDENT BODY SECTION

CROSS-REFERENCE TO RELATED APPLICATION

This application claims the benefit and priority of Indian Application No. 201831022516, filed Jun. 15, 2018. The entire disclosure of the above application is incorporated herein by reference.

FIELD

The present invention relates to gripping sheet metal and stamped parts and, more particularly, to a lightweight designed gripper. It pneumatically propels the modular or interchangeable jaws that are mounted to two different pivot holes and bi-directional mounting brackets for sensing option. The holes are offset from the axis of the gripper body. Also, provided is variable angle adjustability by the jaw opening and adjustable sheet stopping.

BACKGROUND

Sheet metal grippers with competing gripping force with double jaw/single jaw opening options for press shop automation are relatively less compact and sturdy. This limits the speed of the pressing operation that significantly challenges how fast the sheets can be maneuvered from successive forming stations. The heavier the weight of gripper, the more it hinders the end of the robot. This compels the robot to move slower due to an increase in applied moment. Accordingly, it is desired to lessen the weight of the gripper while achieving all gripper characteristics.

Accordingly, the present disclosure provides a modular sheet metal gripper that bridges the bottlenecks of weight aspects with compact size while ensuring competing gripping characteristics. The present gripper is formed from aluminum and steel. The pneumatic actuator sweeps definite air volume for quick actuation. The pair of opposite facing jaws provides a unique cam profile as well as respected pivot points. This prevents the non-gripping end of each jaw from protruding from the top and bottom plane of the gripper body. This enables the use of the grippers in narrow or confined space and direct base mount requirements. The footprint of this gripper is relatively compact compared to currently available grippers, while achieving competing gripping force. The gripper actuation speed is relatively fast.

The jaws of typical grippers are removable and replaceable with different jaws to accommodate to different styles of jaw configuration. For example, jaws having different cam slot shapes may be substituted to partial jaw opening of a bottom jaw.

In a typical production line, grippers are mounted in narrow spaces or confined spaces that limits the jaw opening. The gripper requires jaw opening adjustments. The present gripper has jaw opening angle adjustability arrangements. This facilitates the desired jaw opening by a striker and adjustable bumper that is mounted to the gripper body. Also, an adjustable sheet stopper, designed with a pair of curvature slots, allows adjustable variable stopper plate position. Also this invention includes part presence sensor brackets, jaw open/close position/double blank sensing brackets, magnetic sensor bracket and adjustable sheet stopper are designed with compatible mounting option on both side of the gripper and enable adjusted variable positions.

SUMMARY

A gripper comprises an aluminum body with a gripping portion and a cylindrical portion. The gripping portions comprises a pair of side walls along with a center wall having an open cutout that is in-line with a cylinder axis and perpendicular to the structure from the front end of the gripper body to facilitate easy assembly of gripper parts. The gripping portion comprises a front end opened groove on peripheral sides of the body. This accommodates side plates that includes elongated blind or through-slots that guide flat surfaces of a cam pin on both end. Contour wall in the gripper portion supports and guides the clevis portion of the piston rod that is coupled to the cam pin. A piston assembly, that includes a piston rod, piston, seals and bumpers are positioned inside a bore of the cylindrical portion. This gripper has a pair of jaws that are coupled to the gripper body through two independent pivot pins that extend between the center wall and side wall and are positioned away from the cylinder axis. The pair of gripper jaws includes a cam slot. The cam slot receives a cam bushing that is fastened to the cam pin attached to the piston rod. As the piston rod is moved in a reciprocal manner, by pneumatic or hydraulic power, the cam pin, with the cam bushings, slides through the cam slots causing the gripper jaws to open and close. The cam slots are designed with a particular shape that affects opening and closing of the gripper jaws. This further causes the gripper jaws to become self-locked in the closed position. The self-locking feature prevents the gripper from failing in the event of fluid flow interruption to the cylinder. Also, the pair of opposite facing jaws provides a unique cam profile, as well as, respected pivot points that prevent the non-gripping end of each jaw from protruding from the bottom plane of the gripper body. An axial bore is formed in a wall to define the body of the cylindrical portion. The axial bore enables fluid flow for piston activation. A plug seals the axial end of the bore at the exterior of the cylindrical portion.

The gripper has an external angle adjustability arrangement that facilitates desired jaw opening. It is assisted by a striker that is coupled to the jaw by a dowel pin, at any one of the designated holes at one end, and at the other end, it directly mounts to an extended pivot pin placed between open cutouts in the center wall of the gripping portion. The striker strikes against a threaded bumper that is fastened to a triangle shaped bracket. The bracket is directly mounted to a slot provided at the top of the center wall in the gripping portions of the body. The threaded bumper may be adjusted by screws that limit or control the desired opening angle of the jaw with respect to its pivot. Also, jaws are provided with engraved indicia with numerical values for easy angle adjustments.

The adjustable sheet stopper, with a pair of curved slots, enables variable stopper plate positioning. A pair of sheet stoppers is directly fastened to both peripheral sides of the gripper body by at least one threaded screw. The plates can be interchangeable on any side of the gripper body. The plates can be reversible and fastened to the gripper body to obtain the next range of adjustability. Also, the stopper plate is provided with a centered elongated slot to enable the movable member to provide a sensing option.

The disclosure also contemplates different sensor mounting brackets designed from an aluminum housing with appropriate sensor mounting features. Brackets are designed in manner that can directly fastened to any peripheral side of the gripper body by at least one threaded screw. These plates can be adjustable or fixed at any position depending upon the sensing requirements.

Further areas of applicability will become apparent from the description provided herein. The description and specific examples in this summary are intended for purposes of illustration only and are not intended to limit the scope of the present disclosure.

DRAWINGS

The drawings described are for illustrative purposes only of selected embodiments and not all possible implementations, and are not intended to limit the scope of the present disclosure.

FIG. 5 is a top plan view of FIG. 3.

FIG. 6 is a cross section view of FIG. 5 along line 6-6 thereof.

FIG. 9 is a bottom plan view of the gripper.

FIG. 10 is a perspective view of different jaw styles configurations and tips styles.

FIG. 10a are perspective views that depict embodiments of the gripper jaw member.

FIG. 11a-11d are perspective views that depict embodiments of gripper tips.

DETAILED DESCRIPTION

Figure 1:
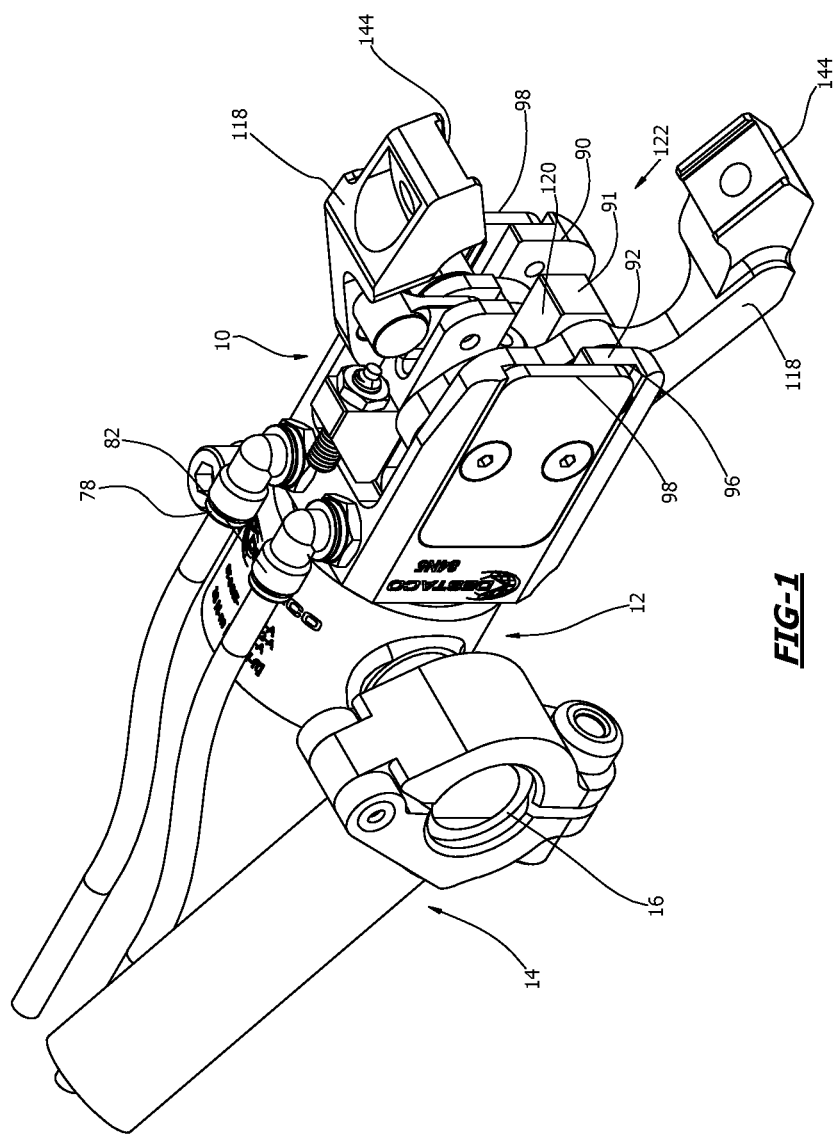
FIG. 1 is a perspective view of a gripper secured on an end effector.
Figure 2:
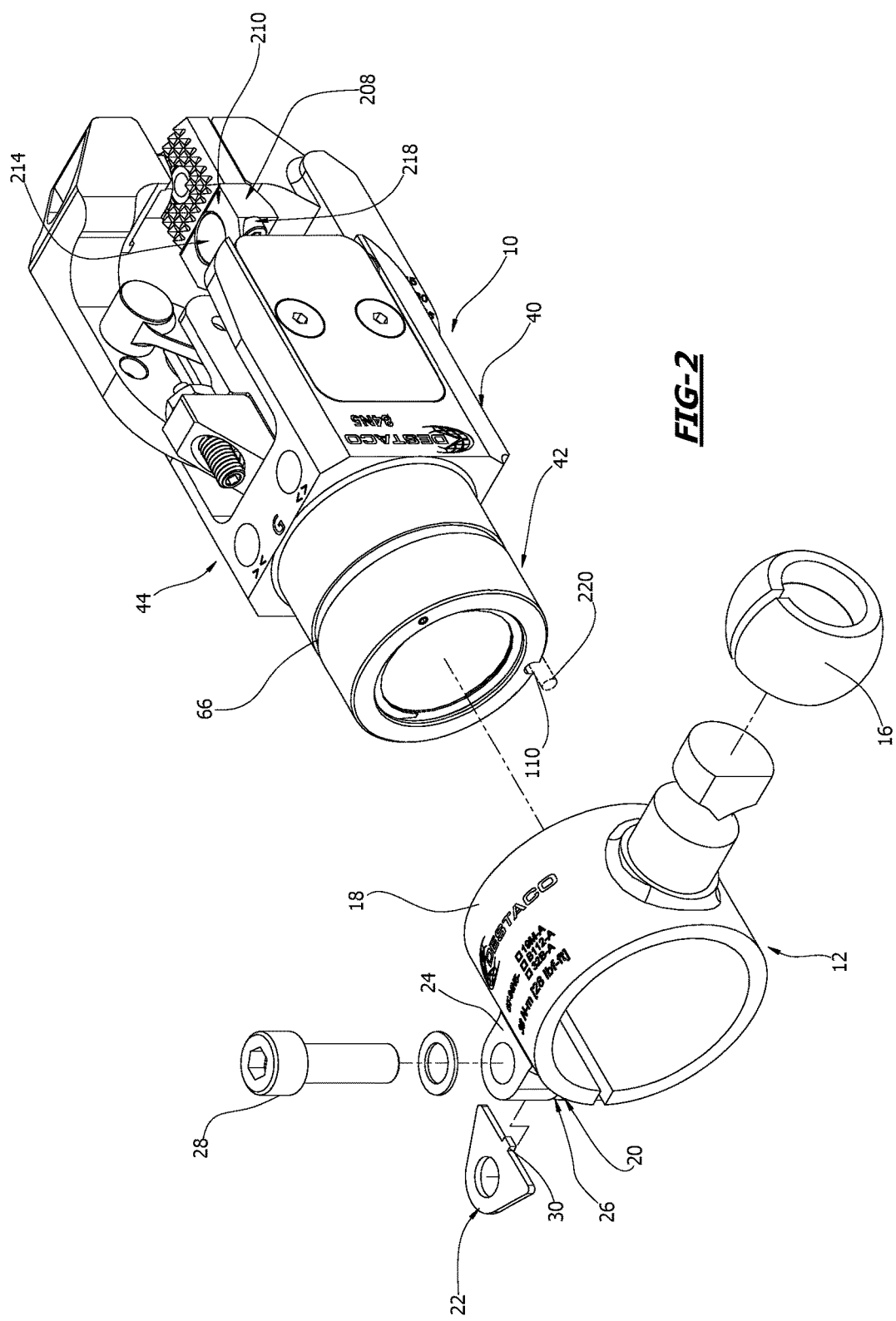
FIG. 2 is an exploded perspective view of the gripper and tooling mounts.
Figure 3:
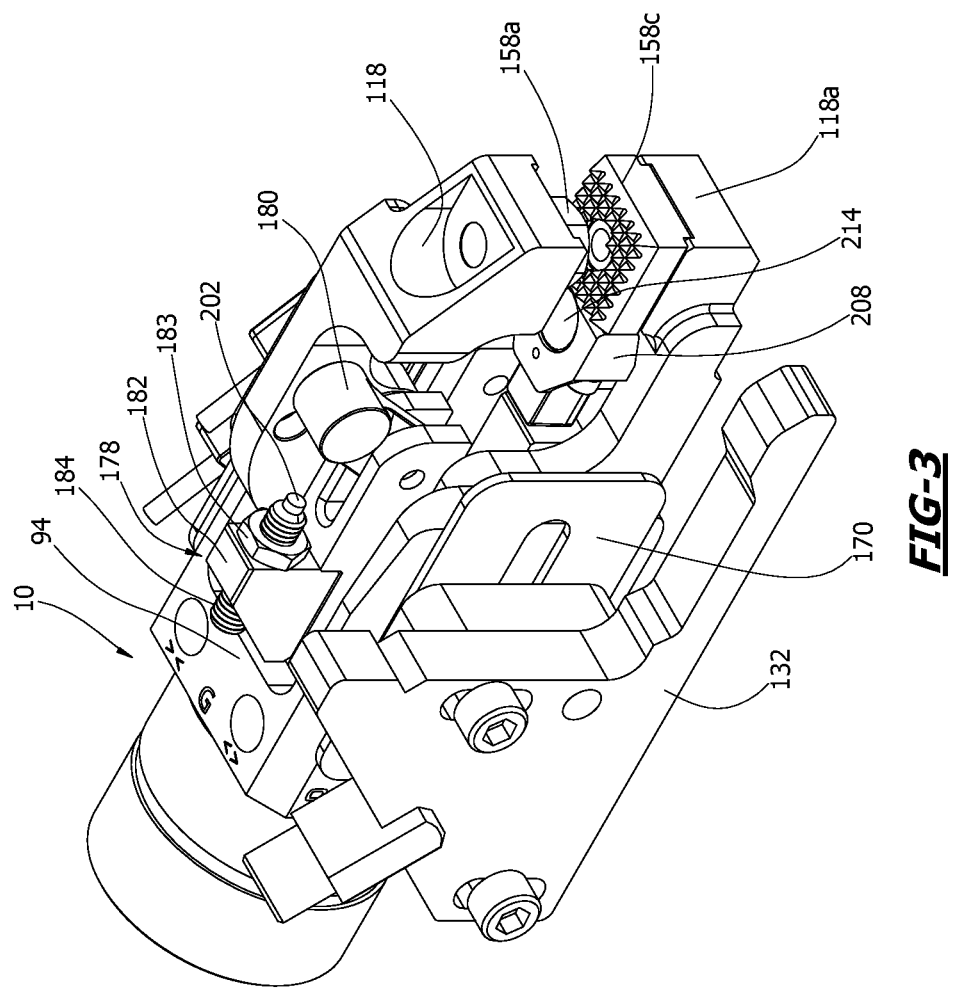
FIG. 3 is a front perspective view of the gripper in a gripping position.
Figure 4:
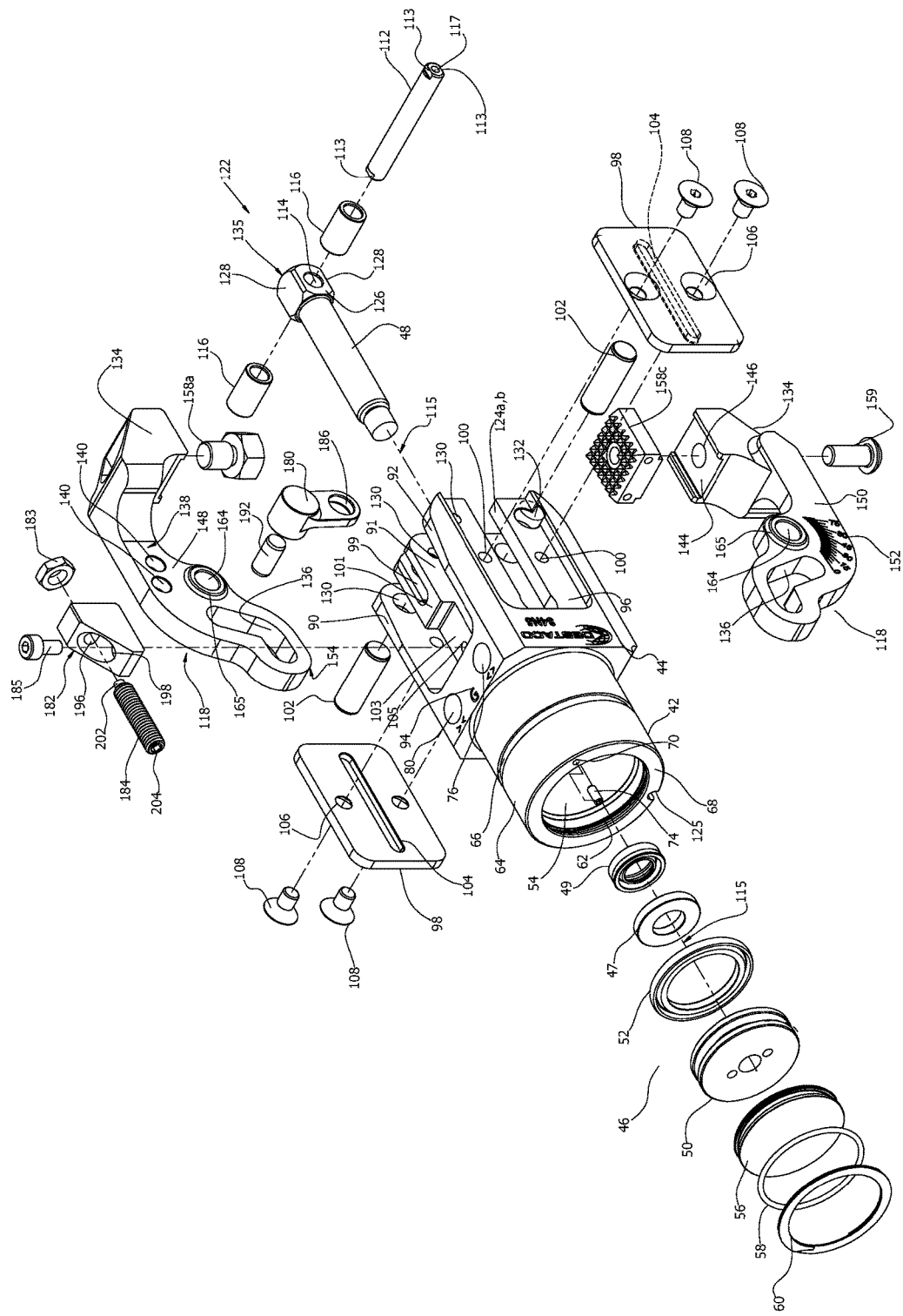
FIG. 4 is an exploded perspective view of the gripper.
Figure 7:
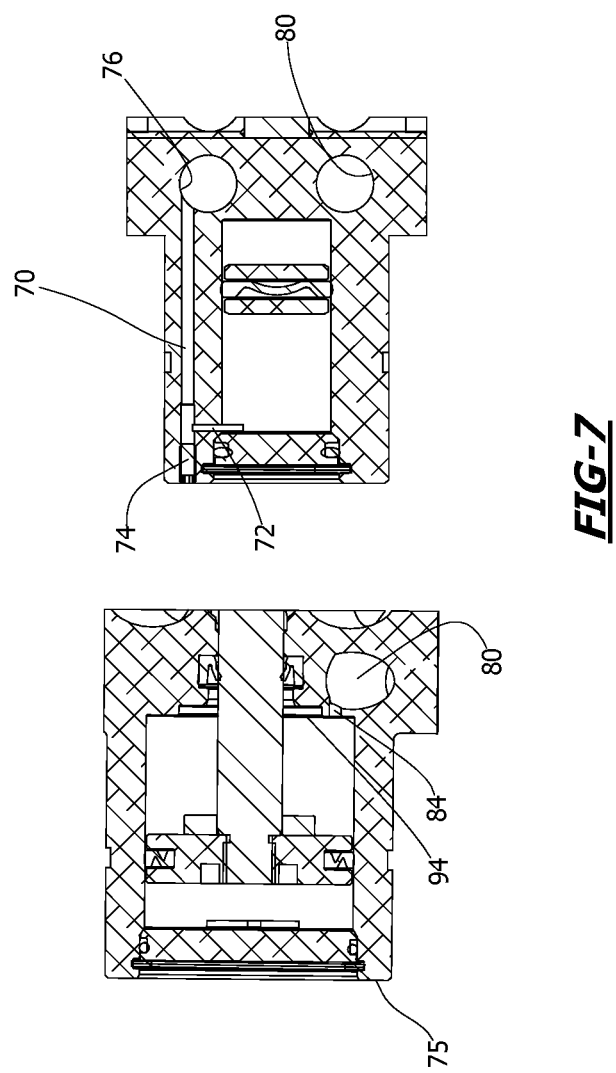
FIG. 7 is a cross section view of FIG. 5 along line 7-7.
Figure 8:
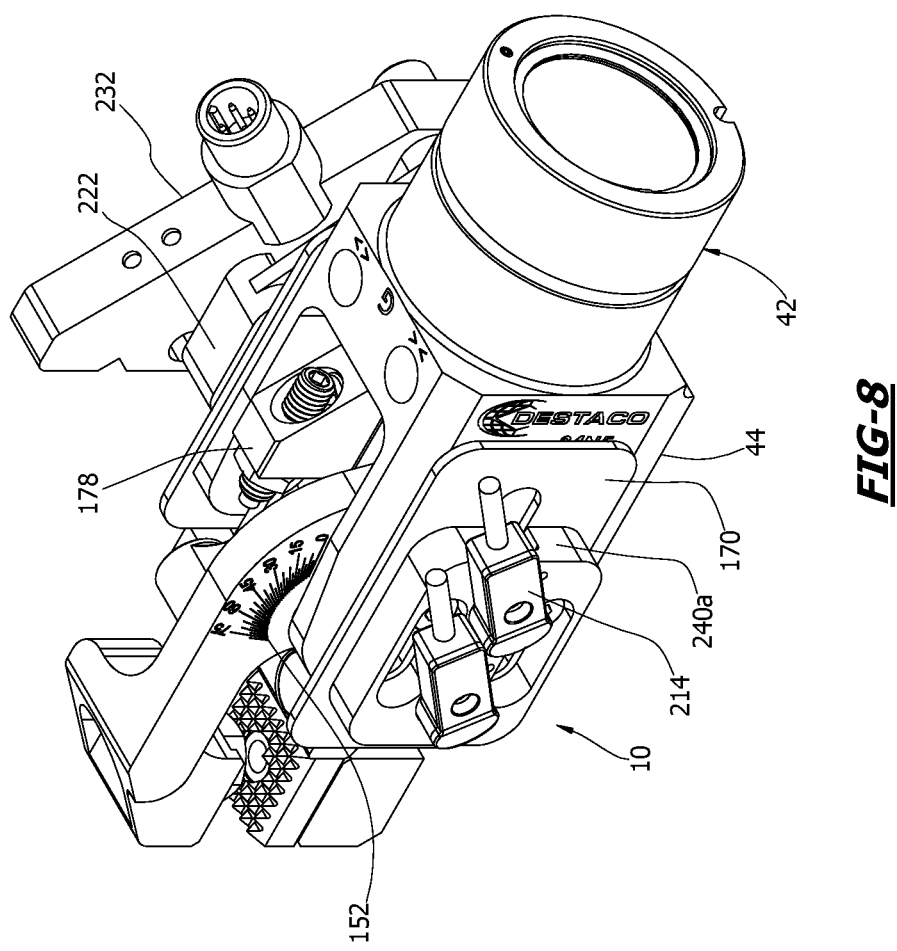
FIG. 8 is a rear perspective of the gripper.
Figure 12:
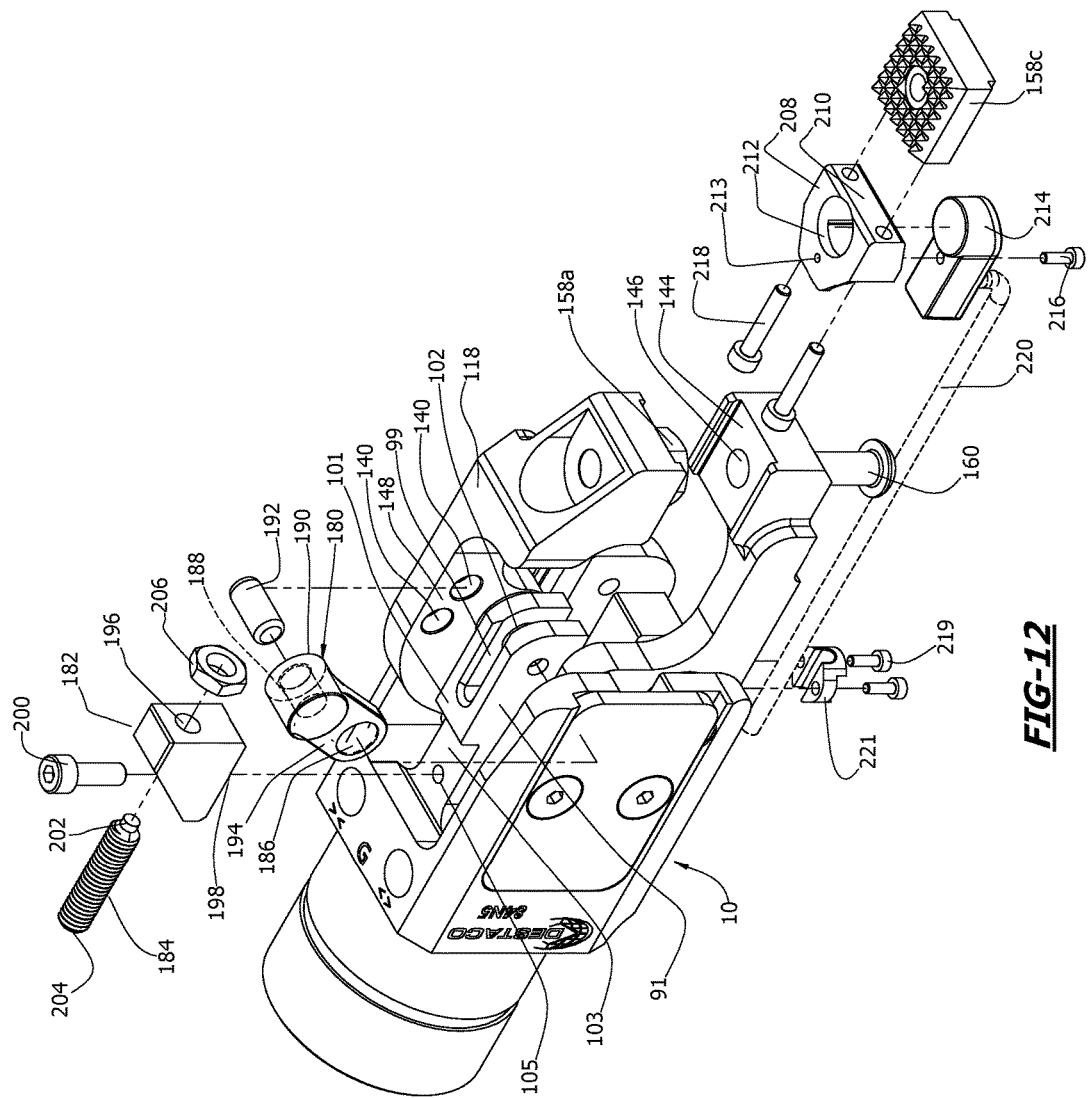
FIG. 12 is an exploded perspective of an external angle adjustment arrangements and part presence sensing arrangement.
Figure 13:
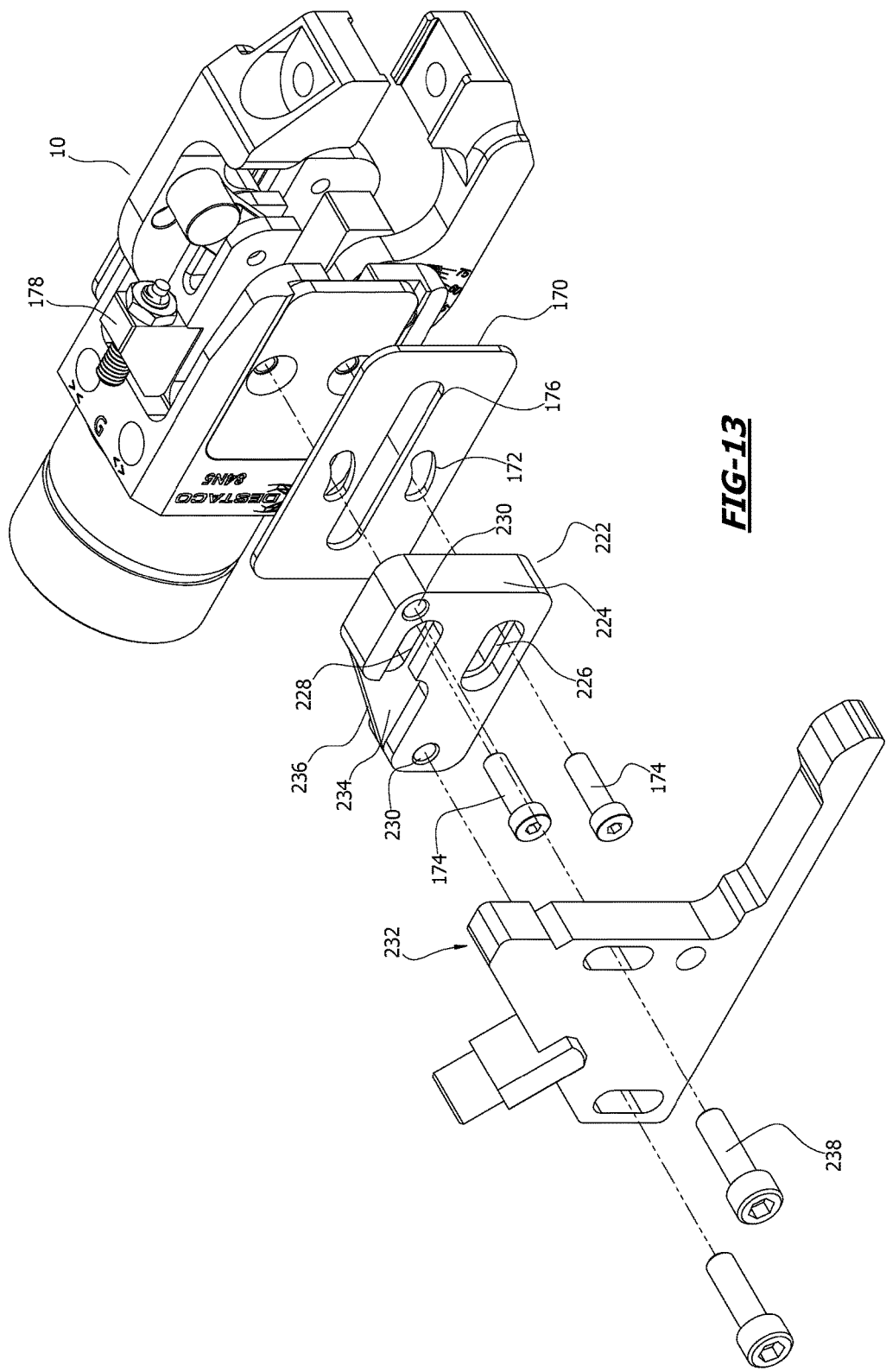
FIG. 13 is an exploded perspective view of a part presence optical/infrared sensor bracket assembly.
Figure 14:
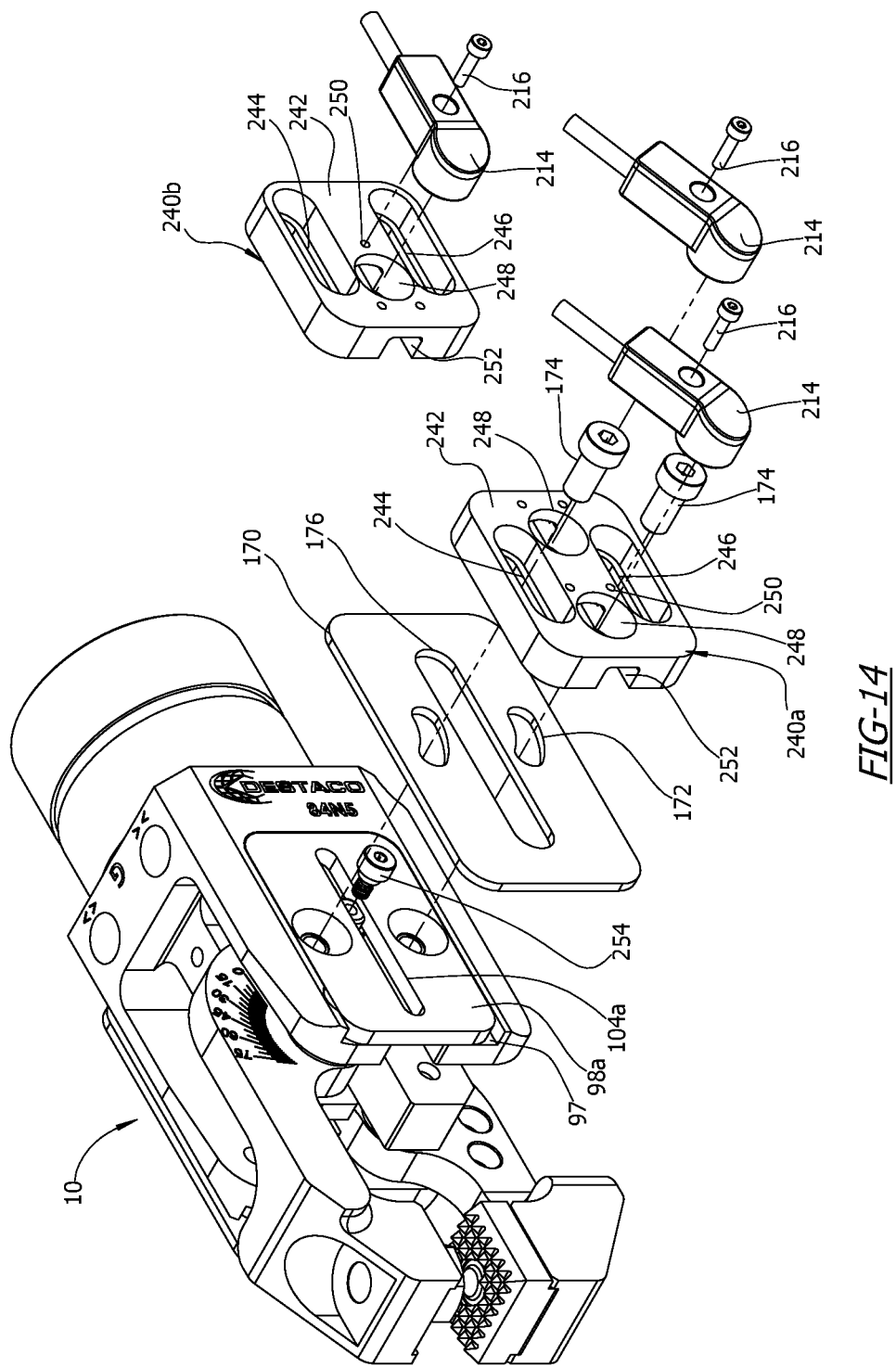
FIG. 14 is an exploded perspective view of a jaw positions/double blank sensing bracket assembly.
Figure 15:
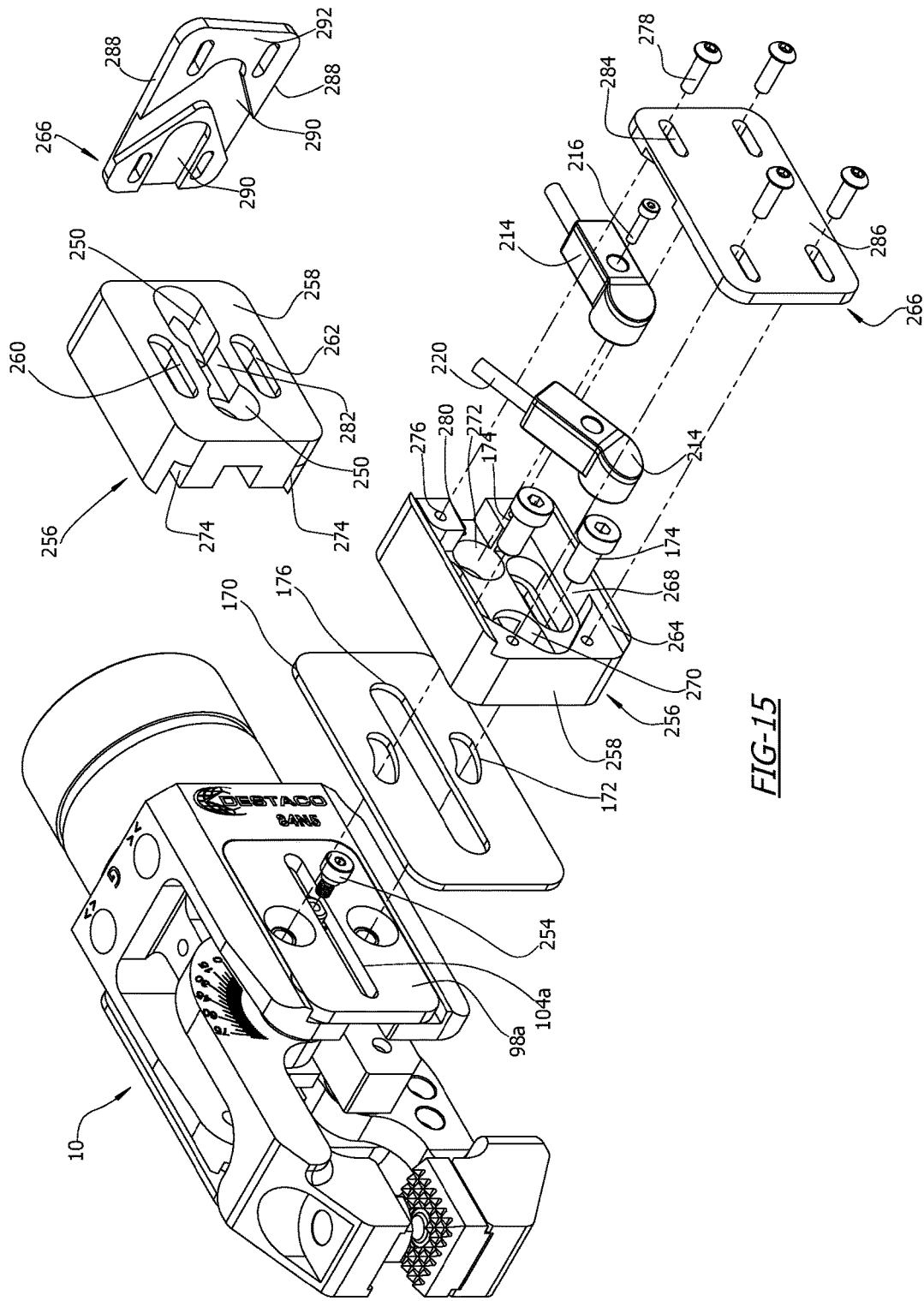
FIG. 15 is another exploded perspective view of a jaw positions/double blank sensing bracket assembly.

Example embodiments will now be described more fully with reference to the accompanying drawings.

Turning to the figures, a gripper is illustrated and designated with the reference numeral 10. A tooling mount 12 secures the gripper 10 onto the end effector tool 14.

The tool mount 12 includes a ball 16, a collar 18 and a threaded block 20. The ball 16 is attached with the end effector tool 14. The ball 16 is secured with the collar 18. A mounting key 22 passes between the blocks 24, 26 and is secured by a fastener 28. The mounting key 22 has an extended portion 30. The extended portion 30 projects into a groove 66 in the gripper 10, as will be explained later.

The gripper 10 includes a body 40. The body 40 is generally of a one piece aluminum or other lightweight metal construction. The body 40 includes a cylindrical section 42, and a trident section 44. The cylindrical sections 42 acts as a housing for a powering assembly 46, here illustrated as a piston assembly. The piston assembly includes a piston rod 48, a rod seal 49, a rubber cushion 47 and a piston 50 with an outer seal 52. The cylindrical portion 42 includes a cylindrical bore 54 to receive the piston assembly. The end of the cylinder bore 54 is closed by a bore plug 56 with an O-ring seal 58. A retaining spring clip 60, via contact of the clip 60 with an inner circumferential groove 62, secures the bore plug 56 and seal 58 in the cylindrical bore 54.

The outer circumferential surface 64, of the cylindrical section 42, includes a circumferential groove 66. The circumferential groove 66 receives the extending portion 30 of the mounting key 22. The extending portion 30 positions and maintains the tooling mount 12 with the cylindrical portion 42 of the body 40.

The cylinder wall 68 of the cylindrical section 42 includes an axial bore 70. The axial bore 70 includes an outlet 72. The outlet 72 enables fluid to enter into the cylindrical bore 54. The axial bore 70 is drilled through the cylinder wall 68 of the cylindrical section 42. The axial bore 70 is closed off by a plug 74. The plug 74 is inserted into the exterior end surface 75 of the cylinder wall 68. The interior end of the bore 70 couples with bore 76. The bore 76 receives a fluid conduit 78. A second bore 80 receives a fluid conduit 82. The second bore 80 is also formed in a web 94 of the trident section 44. The bore 80 is coupled with a fluid outlet 84. The fluid outlet 84 enables fluid to enter into the cylindrical bore 54.

The trident section 44 has a pair of side walls 90, 92 and center wall 91 connected via the web portion 94. The web portion 94 includes the bores 76, 80, generally threaded, that receive the fluid conduits 78, 82. The side walls 90, 92 and center wall 91, in the trident section 44, included open cutouts from the front end 122 of the body aligned with the cylinder axis 115. The open cutouts are defined by guiding surfaces 120 in the center wall 91 and non-guiding surfaces 124a, 124b on the side wall 90, 92. The guiding surfaces 120 may receive clevis portion guiding faces 128 of the piston rod 48.

The piston rod 48 reciprocates on the guiding surfaces 120 by the fluid power from the powering assembly 46 of the cylindrical section 42. The clevis portion 135 of the piston rod 48 having through bore 114, receives the cam pin 112.

The cam pin 112 extends laterally outward, with respect to the cylinder bore axis 115, to receive cam bushings 116. The cam bushings 116 engage the through cam slot 136 of each of the pair of opposing jaw members 118. The jaws 110 are rotated in response to fluid power in the cylindrical sections 42. Both ends of the extended cam pin 112 include flat surfaces 113 that may slide in the elongated blind-slot 104 of slide plate 98. Also, flat surface 113 in the cam pin 112 prevents rotation of the cam pin 112.

Also, cam pin 112 includes a threaded hole 117, along its axis, on each side to receive the sensor flag 254. The outer surface of the each side walls 90, 92 may include grooves 96, 97 that may receive a pair of side plate 98. The slide plates 98 are fixed by fasteners 108 to the threaded hole 100 through the holes 106 of the side plate 98. The groove 96 outer surfaces of the side wall 90 and groove 97 outer surfaces of the side wall 92 includes pivot holes 130, 132, respectively. Both pivot holes 130, 132 are opposite each other and symmetry to cylinder bore axis 115. Both pivot holes 130, 132 are away from the cylinder bore axis 115. Both pivot holes 130, 132 receive a pair of pivot pin 102 for the pair of opposable jaw members 118. The pair of pivot pin 102 is arrested from axial movement by the pair of side plate 98.

Jaw member 118 includes a body 134 with an adjacent arm 138. The arm 138 include through hole 164 to receive the pivot pin 102. Additionally, the arm 138 include a through cam slot 136 to receive the cam bushing 116. The cam bushing 116 is inserted onto the cam pin 112 that is secured to the piston rod 48. The through cam slots 136 have an overall flattened V-shape to enable movement of the jaw 118 from a griping to a non-griping position. The arm 138 includes a set of two blind holes 140 on the first portion 148 that receive striker dowel pin 192. Arm 138 second portion 150 is engraved with angle marks 152 and decimal values for easy jaw opening angle adjustment. The body 134 includes a tip seat 144 and threaded hole 146 that receive clamping tips 158. Also the clamping tips 158 clamp the part between the pair of jaws 118. The clamping tips 158 are permanently locked in place by threaded fasteners 159.

The end portion 154 of the arm 138, in side elevation view, has an overall turtle shell shape. The first side 156 is arcuate and extends from the top portion 156 of the arms 132. The body 134 side is chamfered and extends from the top portion 156 of the arms 132. The second arcuate cutout portion 162 is curved and aligned with an end of the flattened V shape cam slot 136. The pivot hole 164 receives bushing 165 on both portion 148 and 150. Bushing 165 is positioned between side wall 90 or 92 and center wall 91 of the trident section 44. The jaw 118 moves from a clamped to an unclamped position. During movement, the curved end 154 of the arm 138 of upper jaw member 118 of pair of jaw members does not break the plane of an end plane 166 of the body of the gripper. This enables a much smaller cutout in the die for the gripper entry to pick up the sheet metal parts.

In operation, depending upon the state of the piston assembly, fluid enters through port 76 along bore 72 and exits into cylinder 54. The piston assembly moves forward to moves the pair of opposing jaws 118 into a non-clamping or retracted position. The pair of opposing jaws 118 is moved into a clamped position by fluid entering through port 80 through outlet 84 into cylinder 54. This, in turn, moves the piston assembly in a second direction the pair of opposing jaws 118 into a clamped position. The fluid is controlled by a controller (not shown) to moves the pair of opposing jaws 118 into a clamped and non-clamped position. The pair of opposable jaw 118 is independently removable and replaceable by other jaw members (118a, 118b, 118c, 118d, 118e). The through cam slots 136 are defined by particular shape that effect opening and closing of the pair of opposing jaws 118. This further causes the pair of opposing jaws 118 to become self-locked in the closed positions. The self-locking feature prevents the gripper from failing in the event of interrupted fluid flow to the cylinder 54.

FIG. 10 depicts a number of different interchangeable jaws (118a, 118b, 118c, 118d, 118e) that can be assembled in the trident section 44 and coupled to the jaw powering assembly 46. As depicted, each of the different jaws (118a, 118b, 118c, 118d, 118e) have a different tip seating (144a, 144b, 144c, 144d, 144e) designs and or work piece receive orientation that effects different movement characteristics. The modular gripper can be assembled to include gripper jaws (118a, 118b, 118c, 118d, 118e) with different tip (158a, 158b, 158c, 158d) designs that can be used for handling, transporting or transferring, different types of work pieces. Also as the modular gripper can be assembled with gripper jaws (118a, 118b, 118c, 118d, 118e) having similar cam slots (136a, 136b, 136c, 136d, 136e) configurations that affect the angle at which one or both jaws open or close, and which determine whether or not the jaws lock in an open and/or closed position. The tip 158 has a gripping end 165 that receives the gripping parts. A seating end 166 is coupled to tip seat 144 of the jaw member 118 directly by means of threaded fasteners 160. The tip 158a has a threaded bar 167 to couple directly to the jaw member. Tips 158b, 158c, and 159d have a threaded hole 168 to receive fasteners 160 from the jaw member 118. Also the tips 158c and 158d have sets of threaded holes 169 on the peripheral side of the tip to receive the part presence sensor bracket 208.

A steel sheet stopper 170 has a pair of curved slots 172 that enable variable adjustability of the stopper plate position. Sheet stopper 170 directly fastens to both peripheral side of side wall 90, 92 of the trident section 44 by two threaded screw 174. These sheet stopper 170 can be interchangeable to any peripheral side of the trident section 44. Also, it can be flipped about curved slot 172 axis to get the next range of adjustability. Sheet stopper 170 is provided with an elongated slot 176 at its center to allow any movable member that is provided, for the sensing arrangement, to be attached. The sheet stopper 170 is used along with bi-directional mounting sensing bracket 222, 240a, 240b, 256d.

An external angle adjuster 178 facilitates desired jaw opening. It includes a striker 180. Triangle shaped bracket 182 and threaded bumper 184 on the modular gripper. The striker 180 has a pivot hole 186 on one end and a blind hole 188 on the other end. The pivot hole 186 receives the pivot pin 102 that extends between the cutout 99 on the top surface 101 of center wall 91 in trident section 44. The blind hole 188, with extended lip 190, receives the dowel pin 92, in the jaw elongated flat bar portion 148. The dowel pin 92 will be coupled any one of the blind holes 140 on the flat bar portion 148 of the jaw member 118. Two different blind holes 140 in the jaw member 118 define the different range of the jaw opening angle.

The triangle shaped bracket 182 has a threaded through hole 196 on one edge to receive threaded bumper 184. The other edge includes through hole 198 that receives fastener 200 that fastens to center wall 91 of the trident section 44. Center wall 91 includes a groove 103 with at least one threaded hole 105 on the top surface 101. Triangle shaped bracket 182 plugs into groove 103 and is fastened by threaded screw 185. The threaded hole 196 of triangle shaped bracket 182 receive the threaded bumper 184. The bumper 184 has a soft tip 202 at one end and a hex socket 204 at the opposite end to receive a standard tool. The threaded bumper 184 is adjustable by rotation which limits or controls the desired opening angle of the jaw 118 with respect its pivot 130. The threaded bumper 184 is locked into a desired position by screw nut 183. The screw nut 183 can resist the impact of the striker 180 along with coupled jaw member 118. Here, the jaw opening is easily adjustable by using the engraved angle marks 152 on the jaw member 118.

A sensor bracket 208 with a web 210 includes a bore 212 to receive a sensor 214 is coupled with the tip 158. The sensor 214 senses the presence of a part between the pair of opposing jaws 118. When the sensor 214 is positioned in the bore 212, it is secured by a threaded screw 216 onto the web 210. Sensor bracket 208 will be fastened to the clamping tip 158 by threaded screws 218. The clamping tips 158c and 158d have threaded hole 169 to receive the sensor bracket 208 and set of fasteners 218. A wire 220 extends from the sensor 214. The wire passes through below the center wall 91 of the trident section 44. The wire 220 continues into a groove 110 in the cylindrical section 42. The groove 110 surrounds the wire to protect and prevent movement of the wire 220 on the body cylindrical section 42. The wire 220 is held across the center wall 91 of trident section 44 by wire hold 22 which is fastened to center wall 91 by set of threaded screws 219. Additionally, the tool mount collar 18 surrounds the wire locking it in place on the body.

The gripper assembly includes bi-directional mounting sensing brackets 222, 240a, 240b, 256, 294 as well as a reversible sheet stopper 170. Here bracket 222 is referred as optical/infrared sensor part presence bracket, bracket 240a and 240b is referred as inductive sensor jaw positions or double blank presence sensing bracket, 256 is referred to as inductive sensor adjustable jaw positions or double blank presence sensing bracket and 294 is referred to as magnetic sensor adjustable jaw positions or double blank presence sensing bracket. Whereas gripper assembled with bi-directional mounting sensing brackets 222, 240a, 240b, 256, 294 need to replace the side plate 98 in the gripper 10 with side plate 98a which has open elongated slot 104a allows to mount the sensor flag 254 or magnet 306 to cam pin 112.

The bracket 222 has a body 224 with an overall rectangular configuration. It includes counter bore slots 226, 228 that enable lateral adjustment of the bracket 222 and secures to gripper by means of set of fasteners 174. Also, the bracket 222 includes a sensor receiving set of threaded holes 230 that receives sensor 232 and fixed by threaded screws 238. The slot 228 has a cut surface on each side of the bracket 222 called as first side 234 and a second side 236. The sides 234, 236 are the same, except they are mirror images of one another. The side 234 is focused to sensor 232 and side 236 is focused to the gripper 10. Thus, when the bracket 222 is rearranged from one side of the body 40 to the other, the sides 234, 236 exchange their focus, the side 234 is focused to gripper 10 and side 236 is focused towards the sensor 232. And slots 226, 228 enable the sensor 232 along with bracket 222 to laterally adjust in a proper location and fixed to desired positions by means of threaded screws 174. Thus, the user can utilize the right hand side or the left hand side of the gripper 10 without the need for special sided brackets. The brackets 222 designed to receive sensor 232 to enable sensing the part presence in the gripper 10.

The brackets 240a, 240b have a body 242 with an overall rectangular configuration. They include counter bore slots 244, 246 that enable lateral adjustment of the bracket and secure to the gripper by means of the set of fasteners 174. Also, the brackets 240a, 240b includes at least one through hole 248 at mid plane of the brackets that receives a sensor 214. The brackets 240a, 240b are provided with multiple threaded holes 250 at different positions around the through hole 248 on the front side of the brackets. The threaded holes 250 enable the sensor 214 to be positioned in a proper orientation by the sensor mounting screw 216. Also, the brackets are provided with a through channel 252 on the back side of the bracket and inline to the mid plane of the bracket. This enables the free movement of the sensor flag 254 that is attached to the cam pin 112. Sensor flag 254 will travel in the provided channel 252. Thus, when the brackets 240a, 240b are flipped from one side of the body 40 to the other, the multiple threaded hole 250 enable the sensor 248 to be positioned in a proper orientation. The brackets 240a are designed to receive two sensor 214 to enable sensing of the two position like jaw open and close, jaw open and double blank presence. The brackets 240b is designed to receive only one sensor 214. It enables sensing any one desired sensing option like jaw open, jaw close, double blank presence. The brackets 240a, 240b may be positioned on the left or right side of the gripper to eliminate the need for designated side brackets sets.

The bracket 256 has a body 258 with an overall rectangular configuration. It includes counter bore slots 260, 262 that enable lateral adjustment of the bracket and secure the gripper by means of set of fasteners 174. The bracket is provided with guide channel 264 on its front side to receive bracket cover 266, which is in rectangular shape. This enables horizontal adjustment of the bracket cover 266 along with attached sensor 214. The bracket includes the arrow shaped cutout 268 on the guide channel 264 to accommodate the sensor 214 body. The cutout 268 includes elongated cutout 270 that allows the sensor 214 to move freely while position adjustment of the bracket cover and through hole 272 which receives and locates the another sensor 214 in one positions. Also, cutouts 268 are formed with narrow grooves 274 adjacent to guide channel 264 surface that allows the sensor wire 220 to extend out from the bracket 256. The bracket includes a set of threaded holes 276 on the guide channel 264 to receive the fasteners 278 that fix the bracket cover 266 to the bracket. Also, cutout 268 include threaded hole 280 to receive the sensor 214 along with its fastener 216.

Also bracket 256 includes closed channel 282 on the back side of the bracket that is inline to the mid plane of the bracket to enable free movement of the sensor flag 254 attached to the cam pin 112. Sensor flag 254 travels in the closed channel 252. The bracket 256 is designed in a such way that can be flipped from one side of gripper to the other. This enables the bracket to be positioned on the left or right side of the gripper to eliminate the need for designated side brackets sets. The bracket cover 266 has a set of elongated through slot 284 on the front side 286 of the cover that enable fixing of the cover to bracket 256 in variable positions using fasteners 278. The bracket cover 266 includes guiding surfaces 288 that will guide precisely on the bracket 256 guide channel 264 while sensing adjustment. The bracket cover includes arrow shaped cutout 290 on its back side 292 to locate the sensor 214 in place in a given direction. The bracket 256 and cover 266 are designed to receive two sensors 214 to enable sensing the two position like jaw open and close, jaw open and double blank presence with precise adjustment in any given jaw opening angle.

Figure 16:
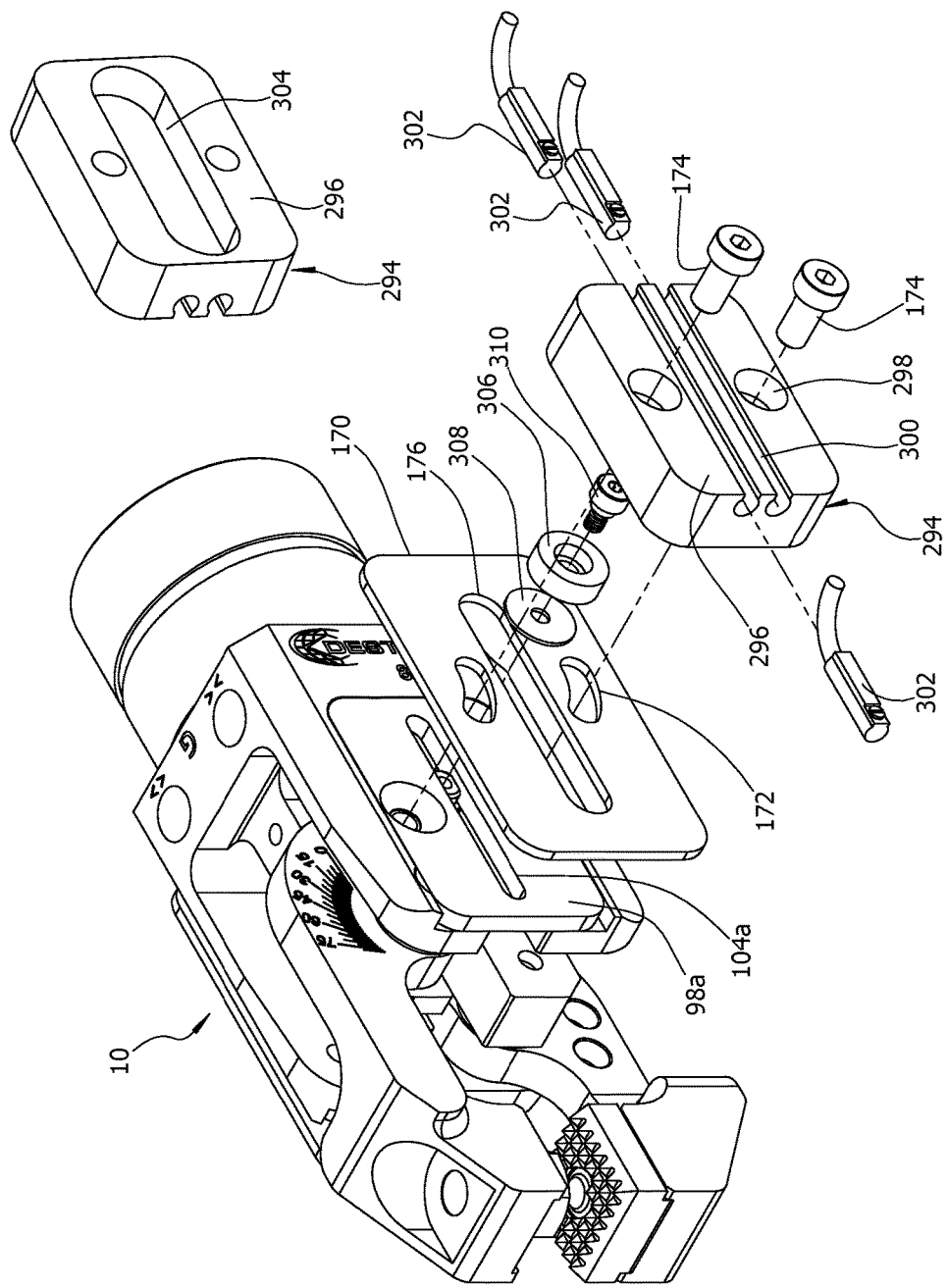
FIG. 16 is a further exploded perspective view of a jaw positions/double blank sensing bracket assembly.

Turning to FIG. 16, the bracket 294 has a body 296 with an overall rectangular configuration. It includes a set of counter bore holes 298 to receive fasteners 174 to fix the bracket to the gripper 10 in defined positions. The bracket 294 includes a set of two identical groove 300 between mid-planes of the bracket on the front side of the bracket. The set of groove 300 receives at least one sensor 302 that is placed in a desired position with inbuilt screw tightening. The number of sensors 302 used in the bracket depends on the numbering sensing requirements like jaw open, jaw close and double blank presence sensing. The groove 300 enables the sensor 302 to adjust very precisely to sense the cam pin 112 location. The body 296 includes closed elongated slot 304 on the back side of the bracket inline to the mid plane of the bracket to allow the free movement of the magnet 306 along with rubber washer 308 which is place behind the magnet. The magnet 306 and washer 308 are coupled directly to the cam pin 112 by means of the threaded fastener 310. The bracket 296 is designed to receive multiple sensor 302 to enable sensing different position and is used on any side of the gripper. The bracket 296 may be positioned on the left or right side of the gripper to eliminate the need for designated side brackets sets.

All the bi-directional mounting sensing brackets 222, 240a, 240b, 256, 296 are designed to be used along, with or without, sheet stopper 170. All the brackets may be secured to either the side walls 90, 92 of the gripper body 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modular gripper assembly comprising:
   a body having a trident section and cylindrical section, the trident section comprises a trident structure that includes, at one end, a pair of side walls along with a center wall, and the cylindrical section includes a fluid driven powering assembly;
   a pair of opposing jaw member pivotally secured to the trident portion about separate pivot pins;
   a cam assembly operatively connected to a piston rod of the fluid driven powering assembly, the cam assembly extends laterally outward with respect to a cylinder bore axis to receive a cam bush that engages with a through slot on each of the pair of opposing jaw members, the jaws rotate with respect to one another in response to fluid power in the cylindrical section; and
   a pair of side plate members, each slide plate member having an elongated blind slot that receives an end of the cam assembly, the ends travel in the blind slot.

2. The modular gripper assembly according to claim 1, wherein the pair of side walls is provided with a groove on both peripheral side to receive the pair of side plates.

3. The modular gripper assembly according to claim 1, further comprising the pair of slide plates being reversible and interchangeable to either side groove of the wall.

4. The modular gripper assembly according to claim 1, wherein the center wall is provided with an open cutout from the front end of the body, that is in-lined with the cylinder axis, to guide the piston rod clevis end.

5. The modular gripper assembly according to claim 1, further comprising a through-slot in each of the pair of opposable jaw members, the jaw members being independently removable and replaceable by other jaw members.

6. The modular gripper assembly according to claim 1, further comprising an adjustable sheet stopper having a pair of curvature through slots that enable the sheet stopper to be fixed at variable positions on the gripper body.

7. The modular gripper assembly according to claim 1, further comprising with jaw opening angle adjustment assembly.

8. The modular gripper assembly according to claim 7, wherein the center wall includes an open elongated slot to receive a striker.

9. The modular gripper assembly according to claim 7, further comprising a jaw member including engraved marks with numerical values on an outer surface for easy angle adjustments.

10. The modular gripper assembly according to claim 7, wherein the center wall includes a groove, with at least one threaded hole, on a top surface to receive a triangle shaped bracket.

11. The modular gripper assembly according to claim 7, further comprising a dowel pin extending from the jaw member fixed to a striker that impacts a fixed threaded bumper wherein the adjustability of threaded bumper is configured to different jaw opening.

12. The modular gripper assembly according to claim 1 further comprising:
    a sensor flag coupled to either end of the laterally extending cam assembly and travels with it; and
    a sensor located adjacent to the sensor flag, the sensor mounted to a sensor bracket, the sensor bracket is adjustable relative to the sensor flag and mounted on either side of the gripper body.

13. The modular gripper assembly according to claim 12, further comprising the sensor brackets being bi-directionally mounted on either side of the gripper, the sensor bracket is either fixed or movable from one side of the trident portion to the other.

14. The modular gripper assembly according to claim 12, wherein the sensor bracket includes a guiding track to receive an integrated sensor cover, the sensor cover is adjustable relative to the sensor flag and is mounted to the sensor bracket.

15. A modular gripper assembly comprising:
    a body having a trident section and a cylindrical section, the trident section comprises a trident structure including, at one end, a pair of side walls along with a center wall, and the cylindrical section includes a fluid driven powering assembly;
    a pair of opposing jaw member pivotally secured to the trident portion about separate pivot pins;
    a cam assembly operatively connected to a piston rod of the fluid driven powering assembly, the cam assembly extends laterally outward with respect to the cylinder bore axis to receive cam bushing that engage with through slots on each of the pair of opposable jaw members for rotation of the jaw members, with respect to one another, in response to fluid power in the cylindrical section;
    a pair of side plate member, each side plate member having an elongated slot that receives an end of the laterally extending cam assembly; and
    a sensor positioned at a tip of one of the opposing jaw members, the sensor senses presence of a part between the opposing jaw members.

16. The modular gripper assembly of claim 15, further comprising a sensor bracket for receiving the sensor.

17. The modular gripper assembly of claim 16, wherein the sensor bracket is fastened to the tip on the one of the opposing jaw members.

* * * * *